(12) United States Patent
Kim et al.

(10) Patent No.: US 9,357,364 B2
(45) Date of Patent: May 31, 2016

(54) FUNCTION COOPERATING METHOD AND PORTABLE TERMINAL SUPPORTING THE SAME

(71) Applicant: Samsung Electronics Co., Ltd., Gyeonggi-do (KR)

(72) Inventors: Hyunseok Kim, Gyeonggi-do (KR); Juseung Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 63 days.

(21) Appl. No.: 13/890,540

(22) Filed: May 9, 2013

(65) Prior Publication Data
US 2013/0310011 A1    Nov. 21, 2013

(30) Foreign Application Priority Data
May 17, 2012  (KR) .......................... 10-2012-0052624

(51) Int. Cl.
*H04M 3/42*  (2006.01)
*H04W 4/16*  (2009.01)
*H04M 1/2745*  (2006.01)

(52) U.S. Cl.
CPC ............ *H04W 4/16* (2013.01); *H04M 1/27455* (2013.01); *H04M 2250/52* (2013.01)

(58) Field of Classification Search
CPC ................ H04L 29/08108; H04M 2207/18; H04W 4/02
USPC .......................... 455/414.1, 566, 412.1, 418
See application file for complete search history.

(56) References Cited

U.S. PATENT DOCUMENTS

2008/0146274 A1*  6/2008  Cho ........................... 455/556.1
2012/0274581 A1*  11/2012 Kim .............................. 345/173

* cited by examiner

*Primary Examiner* — Nghi H Ly
(74) *Attorney, Agent, or Firm* — Cha & Reiter, LLC.

(57) ABSTRACT

A method of linking a function of a terminal includes recognizing a face included in a photo, determining whether there is phonebook information having a photo of a face matched with the recognized face, and generating a gallery-phonebook file. The matched phonebook information is linked with the recognized face. The phonebook information of the gallery-phonebook file is based on the phonebook file stored in the storage unit and a controller determines whether or not to update the phonebook file if a recording date of the phonebook information included in the gallery-phonebook file is older than generation date of the phonebook file stored in the storage unit.

20 Claims, 15 Drawing Sheets

FIG. 3

| PhotoGallery |
|---|
| +nPhotoCnt : int = 0
+nViewType : byte |
| +Edit()
+Add()
+Delete()
+View()
+OpFlick()
CoordinateCal() : int
+SyncPhonbook()
+Store() |

FIG. 5

PhotoGallery

| FileName | PositionXY | PersonalName | Reserved |
|---|---|---|---|

PhoneBook

| PersonalName | FileName | PositionXY | TelNo1 | TelNon | Email | Memo |
|---|---|---|---|---|---|---|

FIG. 6

| FaceDetection |
|---|
| −CordinateVal : char<br>−CordinatePare : char |
| +nPhoto()<br>+ConvertPhoto()<br>+FindFace() : short<br>+DisplaySquire() |

FIG. 7

| PnPDataBase |
|---|
| −nPhotoCnt : int<br>−Name : char |
| +AddRecord()<br>+DeleteRecord()<br>+EditRecord()<br>+AddField()<br>+DeleteField()<br>+EditField() |

FIG. 8

| PhotoFileManager |
|---|
| −nFolderCnt : int<br>−nFileCnt : int<br>−nNodeInfo : int |
| +Add() : char<br>+Delete() : char<br>+Edit() : bool<br>+LinkedList()<br>+MakeTree() |

FIG. 9

| ListView |
|---|
| −nFolderCnt : int |
| −nFileCnt : int |
| +WidthCal()  |
| +HighCal()  |
| +Makethumb()  |
| +MakePosition()  |
| +ResizePhoto() |

FIG. 10

| ThumnailView |
|---|
| −nFolderCnt : int
−nFileCnt : int |
| +WidthCal()
+HighCal()
+Makethumb()
+MakePosition()
+ResizePhoto() |

<1501>

<1503>

<1505>

FUNCTION COOPERATING METHOD AND PORTABLE TERMINAL SUPPORTING THE SAME

CLAIM OF PRIORITY

This application claims the benefit under 35 U.S.C. §119(a) from a Korean patent application filed on May 17, 2012 in the Korean Intellectual Property Office and assigned Serial No. 10-2012-0052624, the entire disclosure of which is hereby incorporated by reference in its entirety.

BACKGROUND OF THE INVENTION

1. Field of the Invention

The present invention relates to a function cooperation of a portable terminal. More particularly, the present invention relates to operations of a portable terminal having multiple functions operating at the same time and coordination between such functions.

2. Description of the Related Art

Electronic devices such as portable terminals have been developed and distributed for convenience and safety of users that include individual consumers, as well as for use in the workplace, and provides convenience for users unknown even a few years ago. Such electronics are now being developed to provide smoother and higher-quality lives of users. For example, a portable terminal may increase user efficiency of time by allowing the easy replay of content regardless of the surroundings and/or time.

Further, the conventional portable terminal often provides additional services (i.e. support functions) related to a particular function for various functions that users need. For example, when the conventional portable terminal includes a camera, such portable terminal separately stores and manages pictures photographed by the camera and pictures received from the outside, and provides other related services such as searching for pictures.

In addition, the conventional portable terminal will store and manages phone numbers of other terminals, and provide phone services required for a call with other terminals. Likewise, the conventional portable terminal provides various support function items to support a certain function required by user, and supports a corresponding function based on the provided function items. However, each function is provided from the perspective of a developer who developed the function, and thus user's accessibility and operability may not be good. For example, in the case of a conventional function of providing a phone number, user checks a certain phone number and contact's name provided based on a text and makes a call. At this time, in case user does not accurately remember the phone number and user's name provided based on the text, the data may be substantially meaningless to user. As such, when supporting a user function, a user-friendly support function with improved user operability is needed.

Moreover, a user of the conventional portable terminal accesses a multi-tasking function to use other functions as well as a certain terminal function. For example, in order to perform a call connection with another terminal while operating a picture search function, the user of the conventional portable terminal should stop a previously-provided function or should activate a screen for call connection, for example, a phone number input or a phonebook list screen. In order to search for select such functions there is a problem that interrupts a user's workflow and has a problem that makes conversion into user's desired work screen inconvenient.

SUMMARY OF THE INVENTION

The present invention has been made at least in view of some of the above problems, and an object of the present invention is to provide a method of a function cooperating method of a terminal that permits a more convenient operation of functions of the portable terminal by maintaining work continuity while allowing user's easy recognition and operation, and a terminal supporting the same.

In accordance with an exemplary aspect of the present invention, a method of linking a function of a terminal preferably includes: recognizing by a controller configured for face recognition a face included in a photo; determining whether there is phonebook information having a photo of a face matched with the recognized face; and generating a gallery-phonebook file by linking the matched phonebook information with the recognized face.

In accordance with yet another exemplary aspect of the present invention, a method of linking a function of a terminal includes: receiving a gallery-phonebook file including phonebook information linked with face information of a photo; and updating a phonebook file stored in a storage unit using phonebook information included in the gallery-phonebook file.

In accordance with still another exemplary aspect of the present invention, a terminal for supporting a function linkage includes: a storage unit for storing at least one photo for supporting a gallery function and at least one set of phonebook information for supporting a phonebook function; and a controller for generating a gallery-phonebook file by, after recognizing a face included in the photo and determining whether there is phonebook information having a photo including a face matched with the recognized face, linking the matched phonebook information with the recognized face.

BRIEF DESCRIPTION OF THE DRAWINGS

The exemplary objects, features and advantages of the present invention will become more apparent to a person of ordinary skill in the art from the following detailed description in conjunction with the accompanying drawings, in which:

FIG. 3 illustrates an exemplary of internal attributes of the photo-gallery class according to the present invention;

FIG. 5 illustrates an exemplary photo-gallery class and the phonebook class having a data layout corresponding to the DB files attributes;

FIG. 6 shows an exemplary gallery-phonebook cooperation system including a face recognition use face;

FIG. 7 illustrates an exemplary PnP database class of the present invention;

FIG. 8 illustrates an exemplary photo file manager class of the present invention;

FIG. 9 illustrates an exemplary list view class of the present invention;

FIG. 10 illustrates an exemplary thumbnail view class of the present invention;

DETAILED DESCRIPTION

Figure 1:
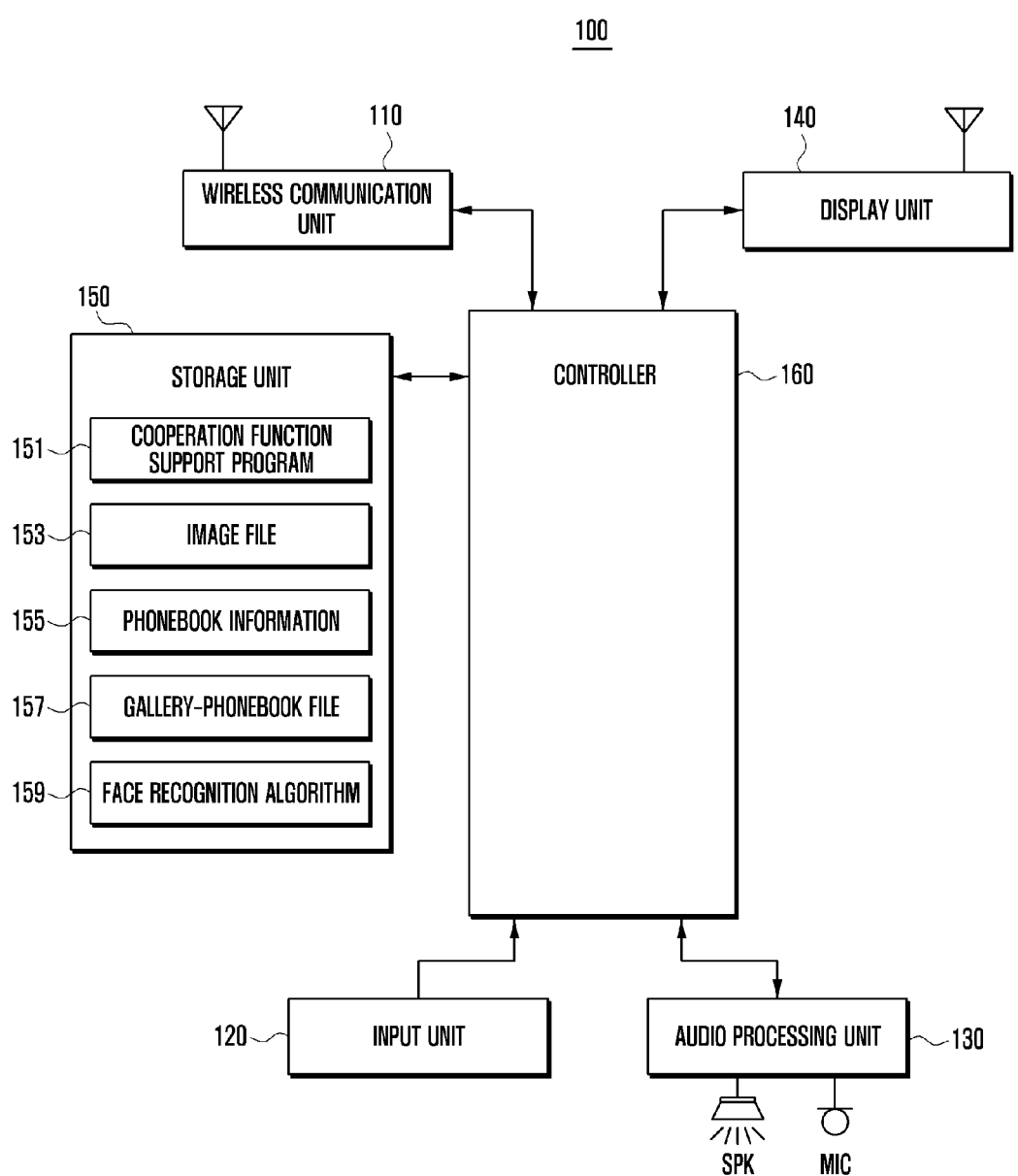
FIG. 1 schematically illustrates an exemplary configuration of a terminal for supporting a functional cooperation according to an exemplary embodiment of the present invention.

Exemplary embodiments of the present invention are described herein below with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

When describing the exemplary embodiments, the description of the components having substantially the same function and structure may be omitted to avoid redundancy.

With regard to the drawings, some components may be exaggerated, omitted or schematically illustrated in the drawings, and the size of each component in the drawings may be different from the actual size of the component. Hence, the present invention is not limited to the relative size or interval drawn in the attached drawings.

FIG. 1 schematically illustrates a configuration of a terminal for supporting a functional cooperation according to an exemplary embodiment of the present invention.

Referring now to FIG. 1, a portable terminal 100 of the present invention includes a communication unit 110, an input unit 120, an audio processing unit 130, a display unit 140, a storage unit 150 and a controller 160. The aforementioned elements of the portable terminal are comprised of hardware and the claimed invention recitation of the word "unit" for such hardware items is to be interpreted under its broadest reasonable interpretation as statutory subject matter in compliance with 35 U.S.C. §101.

The portable terminal of the present invention including this exemplary configuration supports phonebook information 155 stored in the storage unit 150 to be linked with the gallery function.

More particularly, the portable terminal 100 can allow editing, addition and deletion of phonebook information 155 to be linked with the gallery function, and can allow a calling function based on the phonebook information 155 to be operated in the gallery function. Further, the portable terminal 100 allows the update of the phonebook information 155 to be performed using images transmitted and received based on the gallery function by sharing images provided in the gallery function with other terminals through the SNS connection interface, etc. In addition, the portable terminal 100 allows additional information such as information on the location where images have been collected and tagging information attached to the images to be applied to the phonebook information. As such, the present invention supports a function of providing various sets of information in addition to a function of simply providing phone numbers and a photo for an ID card, etc.

The communication unit 110 supports wireless communication function of the portable terminal 100. The communication unit 110 may be added when the terminal 100 is manufactured to support the communication function. Hence, if the terminal 100, to which the present invention can be applied, does not support the communication function, the communication unit 110 can be optionally omitted from the configuration of the terminal 100. Further, the communication unit 110 may be provided in the form of a mobile communication module to support the communication function of the terminal 100, particularly, the mobile communication function. The communication unit 110, which includes a transceiver, supports transmission and reception of signals for performance of the mobile communication function of the terminal 100 by forming a communication channel with the mobile communication system. For example, the communication unit 110 may form at least one of a mobile communication system, a voice service channel, an image service channel and a data service channel, and may support transmission and reception of a certain signal according to the service channel.

Further, the communication unit 110 can support connection to a cloud system for transmission and reception of an image file or sharing of an image file to support a gallery phonebook function of the present invention. In other words, the communication unit 110 may transmit an image file (hereinafter, referred to as "gallery phonebook file") including phonebook information from among files stored in the storage unit 150, or may receive the gallery phonebook file from another terminal according to the request of said another terminal. The received gallery phonebook file may belong to at least one of a category of a gallery function and a category of a phonebook function. As such, the terminal of the present invention may support the gallery phonebook file received through the communication unit 110 to be searched in a state where the gallery function is activated or in a state where the phonebook function is activated.

The input unit 120 generates various input signals needed for operating the portable terminal 100. Such an input unit 120 may be formed of various input hardware means such as a keyboard, a keypad, and key button, etc. depending on the compatibility of the terminal 100. Further, the input unit 120 can be configured in the form of a touch map outputted on a touch screen in case the display unit 140 is provided as a touch screen. For example, the input unit 120 may be configured in the form of at least one of various key maps such as a 3*4 key map, 5*4 key map, QWERTY key map, Dvorak key map. In particular, the input unit 120 can generate an input signal for activation of the gallery function, an input signal for activation of the phonebook function, an input signal for activation of the gallery-phonebook cooperation function, etc. The input unit 120 may generate an input signal for a search of an image file in a state where a gallery-phonebook cooperation function is activate, an input signal for selection of an extracted area of an image file extracted by face recognition, an input signal for generating, deleting or deleting phonebook information related with the selection area, an input signal for requesting operation of a calling function based on the selection area, an input signal for sharing the gallery-phonebook file, etc. according to user's request. The generated input signal is transmitted to the controller 160, and the input signal may be used as a command for performing a function according to each input signal.

The audio processing unit 130, which includes an audio codec, may output various sets of audio data which is set in the process of operating the terminal 100, audio data according to the replay of an audio file stored in the storage unit 150, and audio data received from the outside, etc. Further, the audio processing unit 130 may support a function of collecting audio data. To this end, the audio processing unit 130 may also include a speaker (SPK) and a microphone (MIC). In particular, in the case where a certain audio file is set to be replayed when replaying a gallery-phonebook file, the audio processing unit 130 can support an output of the audio file according to the replay of the gallery-phonebook file. In the above description, the gallery-phonebook file has been described as an image file of a still image form, but the present invention may also be applied to a moving image file as well as a still image file. This type of application of the invention will be described later in detail along with the description on the screen interface of the present invention. Further, when activating the gallery-phonebook cooperation function, the audio processing unit 130 may output a sound effect according to search and selection of at least one image file, a sound effect according to completion of face recognition in the image file, an effect sound according to selection of an extracted area and performance of a call function performed based on the extracted area. Further, the output of the above sound effect may be omitted by user setting of the audio processing unit 130 or a design change of a designer.

The display unit 140 provides various screen interfaces needed for operation of the terminal 100. For example, the display unit 140, which comprises hardware such as a display panel that can be comprise of LCD, LED, OLED, or other types of Thin Film Technology (TFT), supports and displays as an output a standby screen, a menu screen, etc., which are needed for operating the terminal 100. Such a display unit 140 of the present invention may include a touch panel and a display panel. Further, the display unit 140 can include provide various screen interfaces related with the gallery-phonebook cooperation function according to an exemplary embodiment of the present invention. Basically, the display unit 140 may provide a gallery function activation screen and a phonebook function activation screen. Further, the display unit 140 may provide a screen interface for searching for, editing and deleting phonebook information through the gallery-phonebook cooperation function. Further, the display unit 140 may output a screen corresponding to connection to another terminal or an external server through an SNS connection interface based on the gallery-phonebook cooperation function. The screen interface according to the gallery-phonebook cooperation function provided through the display unit 140 will be described in more detail with reference to the screen interface which will be described hereinafter.

The storage unit 150, which comprises a non-transitory machine readable medium, can store various basic operating systems needed for operating the terminal 100, and data, an application program, an algorithm, etc. corresponding to various user functions. In particular, the storage unit 150 can store a cooperation function support program 151 comprising machine executable code for supporting a gallery-phonebook cooperation function of the present invention, an image file 153 for supporting a gallery function, phonebook information 155 for supporting a phonebook function, and a gallery-phonebook file 157 according to the gallery-phonebook cooperation. Herein the gallery-phonebook file 157 may be temporarily generated by real-time cooperation of the image file 153 and the phonebook information 155 as the gallery-phonebook cooperation function is activated when a user inputs a input signal for activating the gallery-phonebook cooperation, or the gallery-phonebook file 157 may be generated as a separate file and be stored in the storage unit 150 by the cooperation of the image file 153 and the phonebook information 155.

In addition, the storage unit 150 may include a face recognition algorithm 159 for face recognition of a photo.

With continued reference to FIG. 1, the cooperation function support program 151 supports various functions to support the gallery-phonebook cooperation function of the present invention. For example, the cooperation function support program 151 may support a photo-gallery function, a sorting function, a view function, a face recognition function, a phonebook function, and an external social network linkage function, etc.

The photo-gallery function may comprise a function of managing a graphic file using a photo included in the terminal 100 or external photo files. The terminal 100 supports a file management function as a photo-gallery function. The file management support function may comprise a function for managing a graphic file having various attributes. The file management function may support operation of functions of adding, deleting and editing a file provided in the file management system. Further, the file management function indexes a graphic file among files stored in the storage unit 150 and manages information thereof for file management. As the photo-gallery function, the cooperation function support program 151 may support a function of sorting indexed photos. The sorting function may sort stored image files or gallery-phonebook files 157 in advance in order to quickly respond to a user's file search request, etc. when the gallery-phonebook cooperation function is selected. Such a sorting function provides appropriate user environment optimally using limited resources such as a portable terminal.

The view function refers to a function of being viewed by a user, and may generally include a thumbnail view function of showing image files, gallery-phonebook files or phonebook information stored in the storage unit 150 as thumbnail images in a checkerboard shape, and a list view function of showing the files as a list form. Further, the view function may support a horizontal view function or vertical view function for at least one file. In addition, the view function supports a flick function in a touch panel (a push function by touching the screen), an arrow key operation function of a separate hardware key, or a soft key operation function of a certain spot for user interaction support according to whether the terminal is implemented, and converts or controls the screen based thereon.

The face recognition function recognizes a certain picture or a face of a certain person included in an image file among functions supported in the gallery-phonebook cooperation function of the present invention. Such a face recognition function may be first performed by a controller configured for such operation when an editing function is performed to view or edit information on a certain person included in a photo or an image. The face recognition function can recognize the face of a person shown in the picture, etc., and may provide the recognized result to user. In this process, the face recognition function may draw a box around the recognized face so as to be provided to user as the result of certain face recognition. As such, the user may check which faces have been recognized and whether the faces are positioned through the boxes displayed on the photo or the image. Further, while it was described herein above that the face recognition function provides a result of recognizing the face using boxes, an artisan should understand and appreciate that the presently claimed invention is not limited thereto. In other words, the face recognition function highlights the boundary area of the recognized face or indicates the recognized face as the arrow so that the position of the recognized face may be indicated through various schemes.

Further, the user may select a face of a certain indicated person, for example, by clicking on a touch panel where the face is displayed, according to the recognition result, and the terminal 100 may provide information registered in advance in the terminal 100 in connection with the person. Here, the terminal 100 may support an editing function for an input of user information in the case where phonebook information 155 linked with the person of the recognized face does not exist or there is no information other than the phone number. Here, the editing function may comprise a function for providing a screen interface for newly inputting phonebook information.

The phonebook function provides user information such as a phone number, address, e-mail and memo, birthday, name, nickname, face photo, etc. by items or groups. Here, the memo may be certain text information recorded by user about a person having the phonebook information. Additionally, the phonebook function of the present invention may inform the user when the phonebook function is linked with the gallery function by showing a photo clipped by a box after face recognition among photos connected through the photo-gallery. Further, the phonebook function newly adds the user information or deletes or edits the generated information.

The external social network cooperation function may locally use the gallery-phonebook cooperation function in a certain (particular) terminal 100, and may share the gallery-phonebook cooperation function with another terminal or server through the network connection. To this end, the external social network cooperation function is configured to support a server connection for a cloud service which is set by user for the user's own terminals for information sharing, and a cloud service registered for information sharing with other terminal users. There are a number of ways the device may reach the cloud, for example, Wi-Fi to a server, or a WLAN connection, as well as WiBro, WiMax, just to name a few possibilities. Further, the external social network cooperation function may share a certain area of another terminal and the storage unit 150, for example, a storage area of the gallery-phonebook file 157.

Further, the cooperation function support program 151 comprises machine executable code that when loaded into the controller supports making information generated by the above described series of functions, or provided for the function support as a database and store the database in the storage unit 150. Here in this example, the making of the database refers to designating a unique key so that user may search for certain information.

Figure 2:
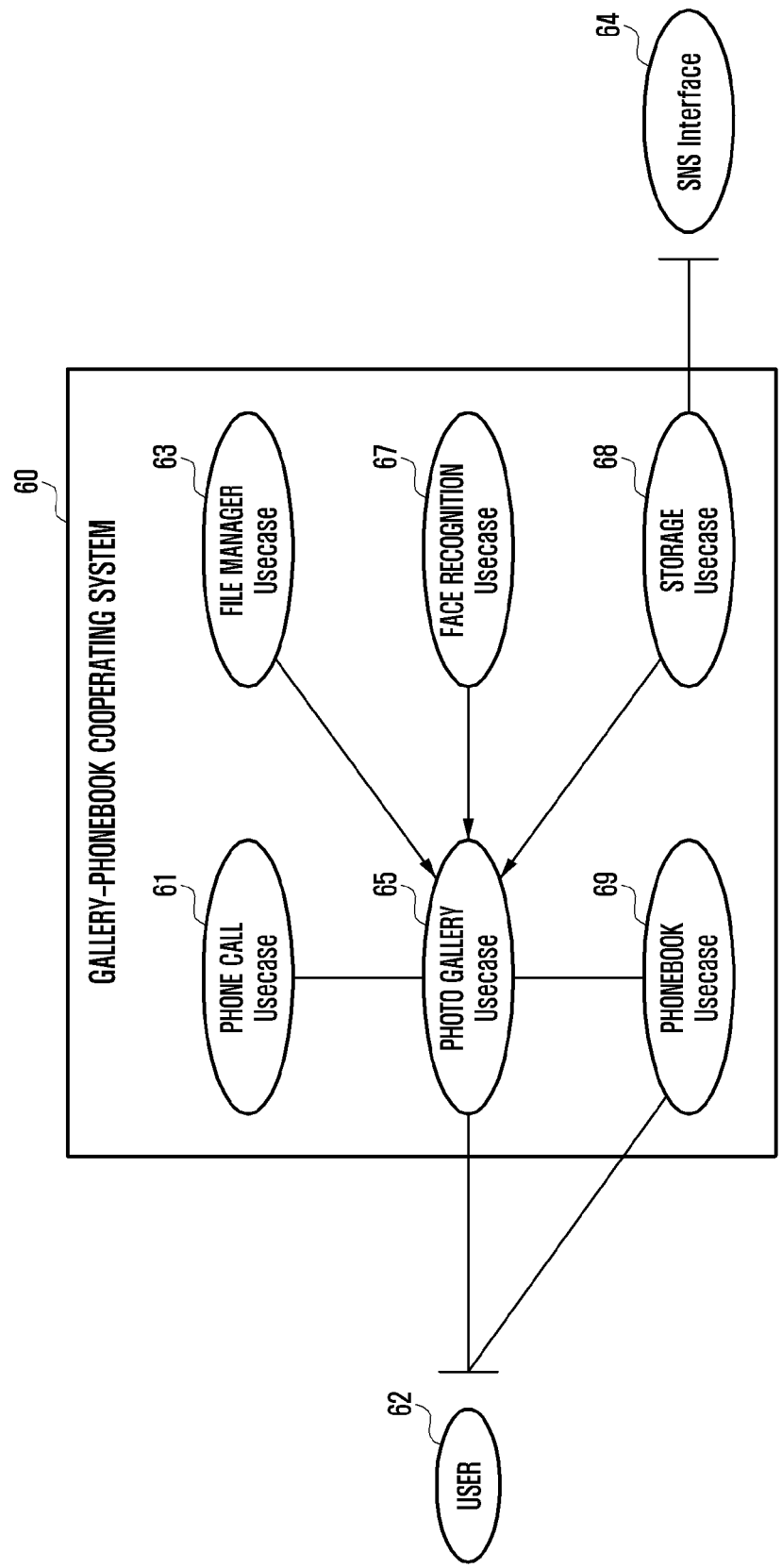
FIG. 2 illustrates an exemplary configuration of a gallery-phonebook cooperation system of the present invention.

The gallery-phonebook cooperation system 60 according to the cooperation function support program 151 may provide six use cases as illustrated in FIG. 2. In other words, the gallery-phonebook cooperation system 60 may include a photo-gallery use case 65, a face recognition use case 67, a phone call use case 61, a file manager use case 63, a phonebook use case 68 and a storage use case 68.

The photo-gallery use case 65 is a use case of an application that manages an image such as a photo used in the current terminal 100. In particular, in the gallery-phonebook cooperation system 60, the photo-gallery use case 65 supports a function of recognizing a face by using the face recognition use case function in a function of searching for a stored photo, comparing information collected through the face recognition with information included in the phonebook information 155, and connecting the phone number included in the phonebook information 155 to the photo according to the comparison result. Further, the photo-gallery use case 65 may support a direct phone call and SNS connection function based on materials that are connected by face recognition.

With continued reference to FIG. 2, the face recognition use case 67 supports position information of a face recognized in a certain image or photo. The face recognition use case 67 may display a box as mentioned above or other shaped type of identifier so that user may recognize position information of at least one face positioned in the certain photo, etc. In addition, the face recognition use case 67 may provide position information of a certain face on a certain picture on the basis of the horizontal and vertical axes as certain coordinate information.

The phone call use case 61 supports an operation of a voice or video phone call function of the terminal 100. In particular, since the phone call use case 61 is directly connected to the photo-gallery use case 65, when a call is terminated, the phone call use case 61 may support the returning point to go to the photo-gallery activation screen without going to the standby state.

The file manager use case 63 provides a list-up function so that indexing by information sets, attributes and dates can be used to conveniently manage information of photos. The photo-gallery use case 65 extends the function of the file manager use case 63 to manage each photo in the form of a file. For example, the photo-gallery use case 65 may show one photo on the screen and sequentially change the screen or a list view showing several photos on the screen based on the file manager use case 63. At this time, the file manager use case 63 may provide a view function through the photo-gallery use case 65 according to a certain input signal inputted from the input unit 120 or the display unit 140, for example, a flick input signal.

The phonebook use case 69 represents a use case in which the user stores contact information registered by user in connection with a certain terminal. The phonebook use case 69 may use unique index information. For example, the phonebook use case 69 can utilize the name of a person related with the user of the terminal 100 as the index key without allocating a separate ID. Here, the phonebook information 155 used in the phonebook use case 69 may be formed of a data type including at least one of several fields such as name, at least phone number, e-mail address, home or company address information, SNS information and others. Additionally, the phonebook information 155 may contain more information for operation of the gallery-phonebook file of the present invention. In other words, the phonebook information 155 of the present invention may be operated as only one of the above field information sets, and can have a data type to which fields such as a memo undefined in the above field information, tag information, etc. are added.

The storage use case 68 supports a function of storing data. In particular, in the gallery-phonebook cooperation system 60 of the present invention, the storage use case 68 stores the result of the natural joining of the data designated in the photo-gallery and data in the phonebook, for example, a gallery-phonebook file 157.

Further, the gallery-phonebook cooperation system 60 has an SNS interface actor 64 that is an external actor, and this external actor 64 may be used to support a cooperation function with an external server through the SNS interface, for example, in the future. In the above described system use case diagram, the actors may be divided into a user actor 62 and an SNS interface actor 64.

The user actor 62 in an example refers to a user of the terminal 100. Further, in the present invention, the user actor 62 may be an interface of another system. In other words, the user actor 62 may be another terminal which can connect to the photo-gallery use case 65 and the phonebook use case 69 in the gallery-phonebook cooperation system 60.

The SNS interface actor 64 may comprise, for example, an external system which approaches the database completed through the phonebook and the photo-gallery, and a service interface such as a Facebook, Twitter, etc. which are currently provided by the current social network service companies.

In the above description, displaying the gallery-phonebook cooperation system 60 as a quadrangle may mean the boundary between the internal system and the external system. More particularly, in order to use the system function of the present invention on the part of the user actor 62, the interface through only the phonebook use case 69 and the photo-gallery use case 65 may be possible, and in the social network, only the storage use case 68 may be accessible.

The controller 160, which comprises hardware such as a processor, microprocessor, comparator, etc., supports a signal flow or data processing external connection control and other command processing for supporting a gallery-phonebook cooperation function according to an exemplary embodiment of the present invention. To this end, the controller 160 can be configured to determine and control operations of various candidate classes such as shown in Table 1 below.

TABLE 1

| Class candidate | Class name: Description |
| --- | --- |
| Photo-gallery | PhotoGallery: Check and edit photos |
| Photo file | PhotoFile: file type photos |
| Photo file manager | PhotoFileManager: Photo manager for managing photos |
| Photo file viewer | PhotoFileViewer: Function of showing a photo file to user |
| Flick | Flick: When viewing photos, an action of providing use convenience |
| List view | ListView: Displaying several photos in the form of a list when searching for photos |
| Phone book | PhoneBook: Storing phone numbers of people |
| Face detection | FaceDetection: Finding face position in photos |
| P&P Synchronization | PnPSync: Logically connecting phonebook with class |
| P&P database | PnPDataBase: Generating photo-gallery connected with phonebook |
| Storage | Storage: Storing data and being connected with external SNS, etc. |
| External social network | SocialNetworkInterface: Connection point for connection to external SNS |

As shown in Table 1 above, the controller 160 can include determining and controlling operation of a photo-gallery class, a photo file class, a photo file manager class, a photo file viewer class, a flick class, a list view class, a phone number class, a face detection class, a phonebook & photo-gallery (p&p) synchronization class, a p&p database class, a storage medium class, an external social network class, etc. Here, the flick class indicates one action, and thus the flick class may be included as the method of the photo-gallery class by defining with only actions without adopting in the entire gallery phonebook cooperation system 60. Each of the above-mentioned class candidates will be described in detail with reference to FIGS. 3 to 11.

FIG. 3 illustrates a photo-gallery class among classes for the cooperation support function of the present invention.

Referring now to FIG. 3, internal attributes of the photo-gallery class of the present invention may have nPhotoCnt and nViewType. Here, nPhotoCnt may include an attribute of storing the number of photos and a point of how to be displayed in the actual screen. This point may become a value selected by user. The photo-gallery class provides Edit( ) operations for editing as an operation function, Add( ) operations for addition and Delete( ) for deletion. Further, the photo-gallery class may include View( ) operations for actually showing to actual user. Further, the photo-gallery class may include CoordinateCal( ) operations of storing data positions received from the face detection class as coordinate values. CoordinateCal( ) operations may support a separate operation for informing use of points about coordinate values.

The photo-gallery class includes SyncPhonebook( ) operation for cooperation with the phone number class. SyncPhonebook( ) operation performs synchronization operation on the basis of a phone number and a separate key, and in the present invention "Name" may be set as the key. Further, the photo-gallery class may be a class related with the p&p database class. In other words the supporting of related data is made as a database and separate management of the database is performed after synchronization and joining of the photo-gallery class and the phonebook class.

Figure 4:
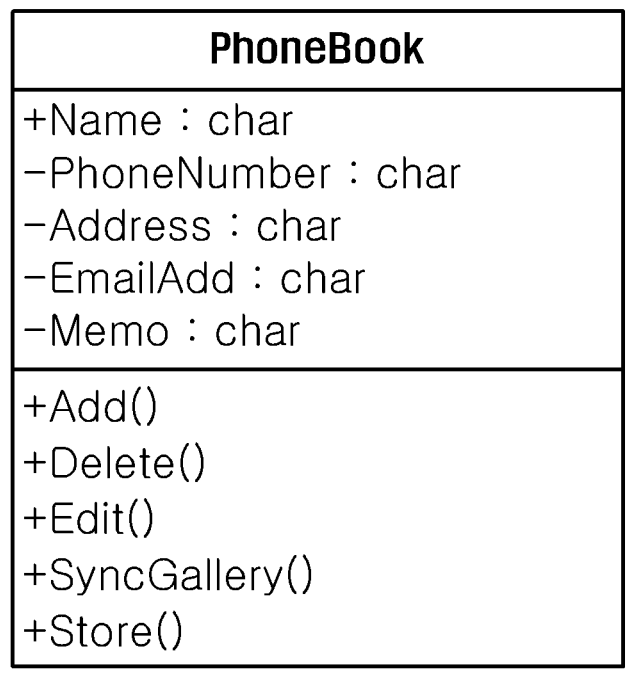
FIG. 4 illustrates an example of internal attributes of the phonebook class among classes for the cooperation support function of the present invention.

FIG. 4 illustrates a phonebook class from among the classes that can be utilized for the cooperation support function of the present invention.

Referring now to FIG. 4, the phonebook class of the present invention may include Name, PhoneNumber, Address, EmailAddr, and Memo as attributes. Further, other attributes may be added to the attributes of the phonebook class or some attributes may be deleted according to user's request or system design or needs. The phonebook class provides basic operations of adding, deleting, editing and storing records. Further, the phonebook class includes SyncGallery( ) operation for the gallery-phonebook cooperation system 60 of the present invention. The SyncGallery( ) operation synchronizes the record according to the coordinates provided in the photo-gallery class using Name field as the basic function of the phonebook class having a strong relation with the photo-gallery class. The photos handed over from the photo-gallery class may be stored in the record, and user may check the record selected in the phonebook.

FIG. 5 illustrates one example of a data layout of a photo-gallery class and a phonebook class of the present invention.

In order for the photo-gallery class and the phonebook class to be synchronized in the gallery-phonebook cooperation system 60 of the present invention, the photo-gallery class and the phonebook class may have a structure corresponding to the DB file attributes as illustrated in FIG. 5. In other words, the photo-gallery class and the phonebook class may have a meta-file as well as a picture file. More particularly, the photo-gallery class having a picture file should have a meta-file such as FileName, PositionXY, PersonnalName as illustrated in FIG. 5, and the phonebook class should synchronize the meta-file of the photo-gallery class as the unique key. Here, the unique key may be PersonnalName. It is normal to have a field for preventing redundancy as the unique key in the database, but in the case of the terminal, it is possible to use a personal name as a unique key without generating a separate unique key for the database. If the PersonnalName is joined as the key, the field illustrated in FIG. 5 is added to the database of the phonebook class, and the synchronization with the photo-gallery class may be completed. Here, the completion of the synchronization can signify completion of the preparation for calling for data of the phonebook class in the photo-gallery class.

FIG. 6 illustrates a face detection class according to an exemplary embodiment of the present invention.

Referring now to FIG. 6, the FaceDetection Class may have CoordinateVal and CoordinatePare attributes.

The face detection class stores the coordinate values within the detected face photo in the attributes of CoordinateVal.

Further, in the case of several detected faces in the same photo using CoordinateVal attribute, the face detection class may distinguish the result. In the face detection class, nPhoto( ) performs a function of accepting an external photo, and CovertPhoto( ) operand performs a function of covering a portion except the face to detect the face. FaceFin( ) operand checks the location of a portion covered in the CovertPhoto( ) operand, and returns the coordinates of the portion recognized as the face. DisplaySuqire( ) operand performs a function of informing user of a position so that user may easily make a choice by drawing a separate outer line of a portion recognized as the face.

FIGS. 7 and 8 illustrate a PnP database class and a photo file manager class according to an exemplary embodiment of the present invention.

The photo file manager class recognizes the attribute of an inputted file, and stores the file as a tree structure for addition, deletion and editing for file management. The PnP database class makes data in the phonebook as a database for management. As such, the PnP database class is related with the phonebook class, the photo file manager class is related with the inputted picture file, and in order to determine the type of the inputted file, dependency on the photo file class is shown.

FIG. 9 illustrates a list view class according to an exemplary embodiment of the present invention, and FIG. 10 illustrates an exemplary embodiment of thumbnail view class.

As illustrated, the list view class and the thumbnail view class supports to display photo files in the form of a list or in the form of a thumbnail according to user's selection. The method of the list view class is similar to the method of the thumbnail view class, but the content and operation of the list view type are different from the content and operation of the thumbnail type, and thus they are classified as separate classes.

Figure 11:
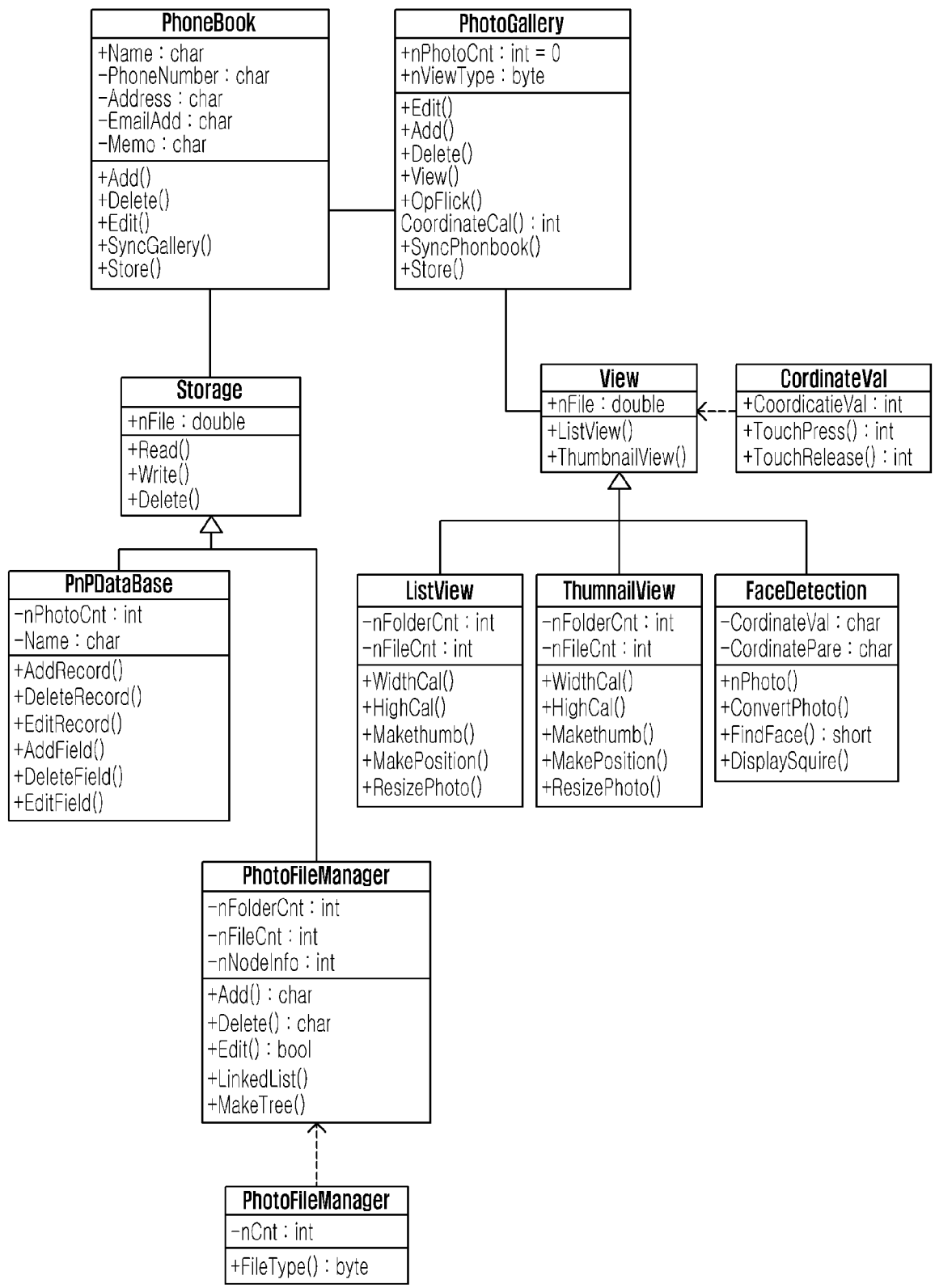
FIG. 11 illustrates a diagram related with each class of the gallery-phonebook cooperation system of the present invention.

FIG. 11 illustrates a diagram related with each class of the gallery-phonebook cooperation system of the present invention.

Referring now to FIG. 11, mutual synchronization is performed with multi-versus-multi relation using the SyncGallery( ) of the phonebook class and the SyncPhonebook( ) of the photo-gallery class regardless of the relation between the phonebook class and the photo-gallery class. The synchronization data of the phonebook class and the photo-gallery class is stored in the PnP database class.

Figure 12:
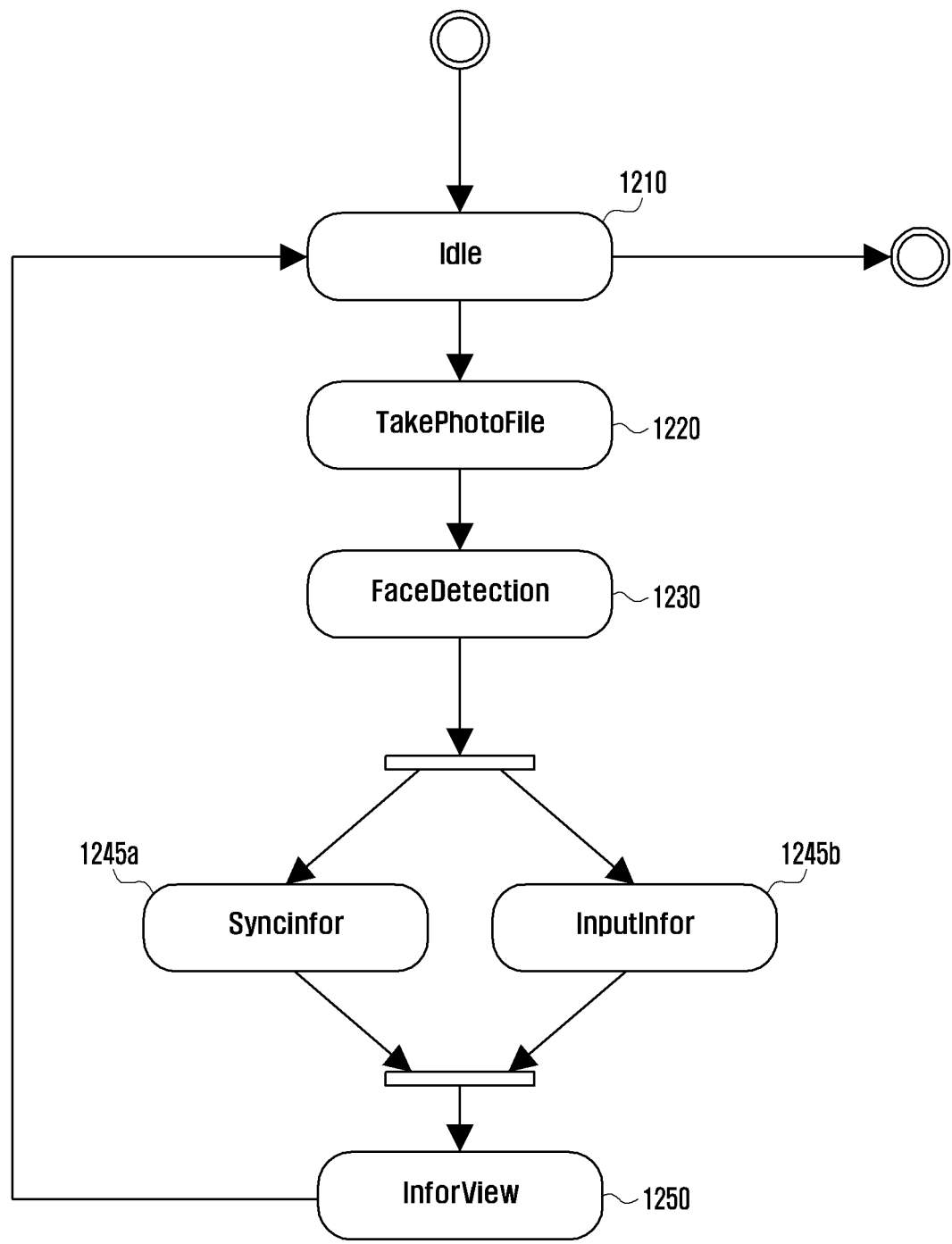
FIG. 12 illustrates an exemplary flow operation of a gallery-phonebook cooperation system of the present invention.

FIG. 12 illustrates a state diagram of a gallery-phonebook cooperation system according to an exemplary embodiment of the present invention.

Referring now to FIG. 12, the operation of the gallery-phonebook cooperation system in this example has six (6) states. In other words, the state of the gallery-phonebook cooperation system may have six states that comprise Idle, TakePhotoFile, FaceDetction, SyncInfor, InputInfor, and InforView.

With continued reference to FIG. 12, idle state 1210 is status where the terminal has entered the gallery-phonebook cooperation system of the present invention. More particularly, when entering the phonebook cooperation system, the terminal 100 may be in an idle state. The idle state is a standby state for moving to the next state. Further, when operating the gallery-phonebook cooperation system of the present invention at the initial stage, the initialization process of the terminal 100 may also be performed in the idle state.

TakePhotoFile state 1220, for example, comprises in this example a state for bringing a photo file, or a state having brought the photo file. All digital photos exist in the form of a file, and thus in the gallery-phonebook cooperation system of the present invention, the already stored photo file and the newly photographed photo may be recognized as the same photo file.

The FaceDetection state comprises a state in which a user scans photos in advance so that user may easily select the face on the photo in the photo file having been read, and the position of the recognized face is informed. The FaceDetection state may be a state of informing user of each face position through certain effects, for example, displaying boxes or highlighting the faces in case there is a plurality of faces in the photo.

In the case where a user selects a photo, SyncInfor state and InputInfor state in this example comprise a state where phonebook information is connected or user information is added to the selected photo. In particular, SyncInfor state in this example comprises a state for connecting phonebook information with the photo by reading the database of the existing phonebook information. InputInfor state refers to a state of adding photos and new data of the phonebook to the phonebook database when newly added to the database of the phonebook through photos.

InforView state comprises a state of configuring a screen as one of List View state or Thumbnail state. In case the value designated in advance by the user is the setting of the List View state, the InforView state supports display of the items outputted on the screen as the List View state and, in case the value designated in advance by user has been set in the Thumbnail state, the InforView state supports configuring the screen as the Thumbnail state.

Based on the above stated six states, the gallery-phonebook cooperation system according to the above-example provides the terminal 100 as the idle state in case user first tries to utilize the terminal. In this idle state, the initialization process is also performed as described above, and the state may be promptly terminated. Moreover, when the user selects a photo, the process may move to the TakePhotoFile state.

The initialization process of the terminal 100 can move to the FaceDetection state 1230 where the terminal 100 automatically detects and displays a person's face so that user may easily select a certain person displayed in the photo. In case an input signal for connecting to the existing phonebook data in FaceDetection state is generated, the process of the terminal 100 moves to SyncInfor state 1245a, or in the case that phonebook data is newly generated, the process moves to InputInfor state 1245b. When the above described states are completed and the entire photos are displayed in the display unit 140, the photos may be displayed in the form of List View or Thumbnail View according to the view scheme selected in advance by user. Thereafter, the process of the terminal 100 returns to the idle state according to the next action to repeat the above described states.

Figure 13:
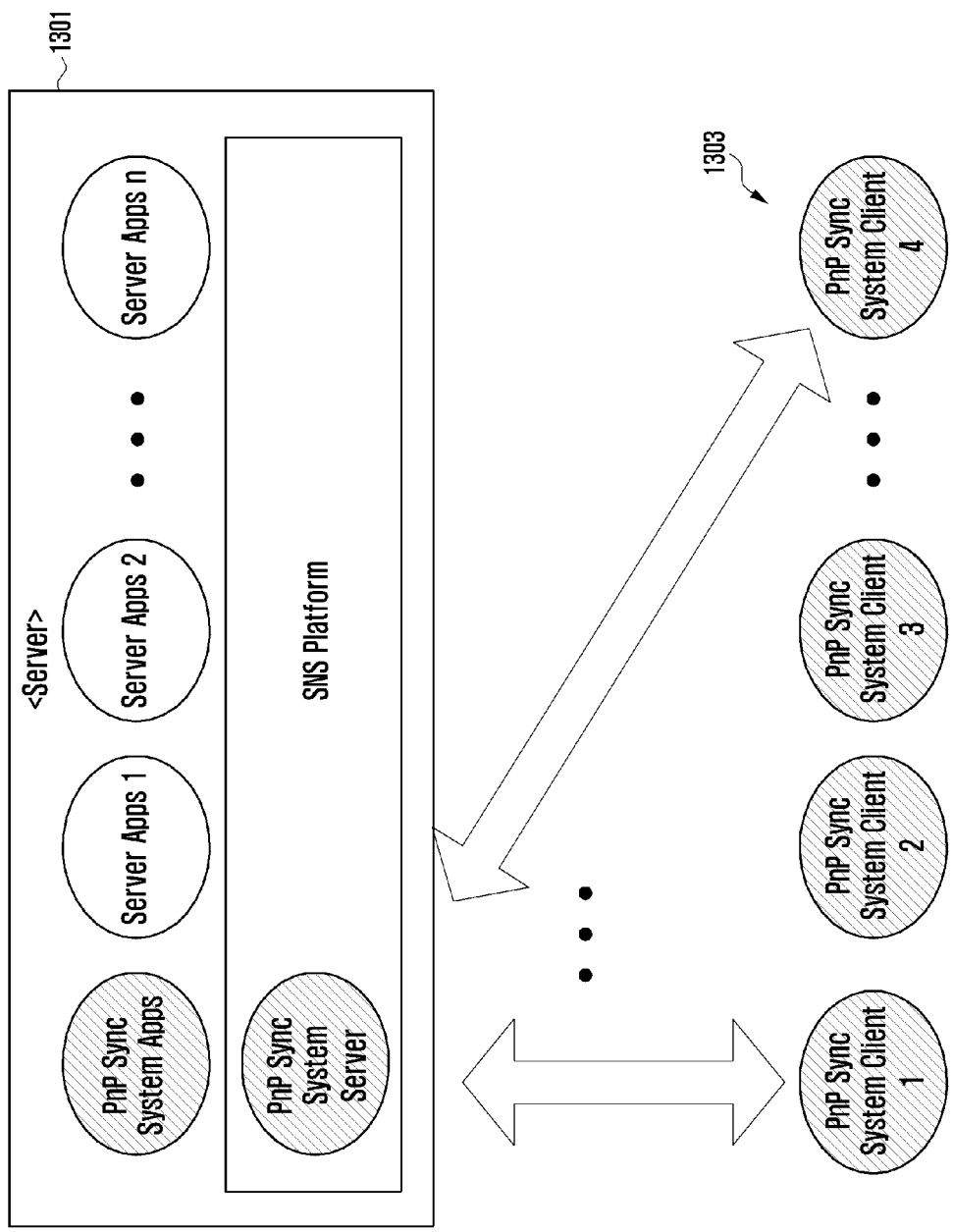
FIG. 13 illustrates an external linkage system according to an exemplary embodiment of the present invention.

FIG. 13 schematically illustrates a configuration of a system for connection of a gallery-phonebook cooperation function with a social network service through an SNS interface according to an exemplary embodiment of the present invention.

Referring now to FIG. 13, the connection system 1300 in this example can be configured to include a server 1303 and at least one client 1301. Here, the client 1301 may be a terminal for operating a gallery-phonebook cooperation system of the present invention.

The connection system 1300 may form a network with an unspecified terminal, or may form a network with a certain terminal group. In the actual client, as illustrated about the use case, connection with the server 1303 in the storage use case or DBMS may be possible.

In case the photo of a certain person including information synchronized with the phonebook information is uploaded to the server 1303 with the allocated account, another user related with the person may view or edit the photo in the above described connection system 1300. To this end, the connection system 1300 provides an editing function in which another user may provide additional information to uploaded photos, through which information sharing with other users may be induced. According to such a service support, the connection system 1300 provides support so that much social information may be acquired by the addition of information of people related with a certain person who has uploaded the first photo without a separate operation or control efforts of the certain person, and provides support so that additional information update may be possible according to the control of the certain person in the terminal of the certain person.

Further, the interface in the gallery-phonebook cooperation system 60 according to an exemplary embodiment of the present invention may provide API of Read/Write/Delete/Add/Edit as the standard API. Additionally, the gallery-phonebook cooperation system 60 of the present invention may further include an API that provides position information provided in a photo. The Position API, which provides the position information, may provide user information of a face-detected certain person positioned in the photo, and may provide information about a certain building or a certain object included in the photo. Additionally, in the case of the photo, position information may be distorted in the process of transmitting or resizing the photo due to the problem of the SNS server 1303 or client. Hence, the position API may recognize such a distorted point and support an amending function. For example, after a certain person connects to the SNS server as a client 1301, a photo with a high resolution may be uploaded. Thereafter, when the client 1301 of another user related with the certain person tries to view a picture with a high resolution by connecting to the SNS server 1303, if the above mentioned high resolution is not supported, the gallery-phonebook cooperation system of the present invention may be supported through the resizing of the photo in the server 1303. In this exemplary case, if the gallery-phonebook cooperation system does not perform amendment of the position of the resized photo, incorrect information may be shared with another client 1301. Furthermore, even though the terminal connecting to the SNS server 1303 is the terminal of the same user, if the attributes of the terminals are different from each other, that is, in the case of the terminal that does not support a high resolution, the amendment of the position may be necessary. As such, the client 1301 or server 1303, in which the gallery-phonebook cooperation system is implemented, may adjust the position of elements included in the photo in the process of resizing a certain photo using Position API.

Further, in the process of performing a function connecting the photo to the phonebook, the cooperation function may be limited depending on whether or not the person included in the photo is allowed. To this end, the terminal 100 of the present invention may support a function of limiting a function of linking phonebook information with certain photos. As such, after limiting the phonebook information cooperation function for a certain photo, in case the photo is uploaded to the SNS server 1303, even if another user shares the photo, it is within the spirit and scope of the presently claim invention to limit arbitrarily linking the phonebook information.

As described above, the function cooperating method of a terminal and a terminal supporting the same according to an exemplary embodiment of the present invention provides support operation of phonebook information based on an intuitive user interface based on an image by linking a phone number with a face of a certain person recognized in a photo.

Figure 14:
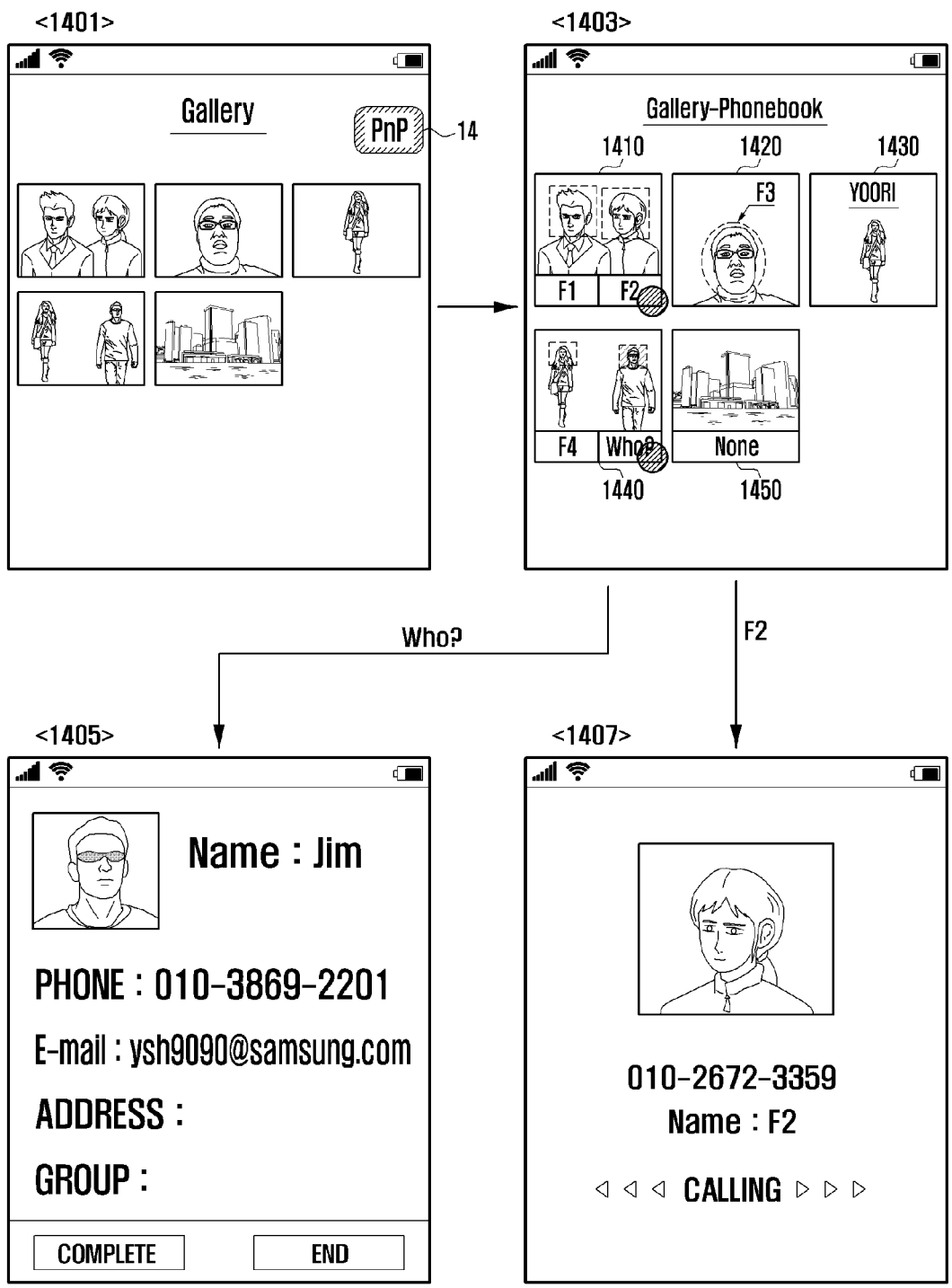
FIG. 14 illustrates an example of a screen interface for supporting a functional cooperation according to an exemplary embodiment of the present invention.

FIG. 14 illustrates an example of a screen interface of a terminal 100 supporting a gallery-phonebook cooperation function according to an exemplary embodiment of the present invention.

Referring now to FIG. 14, user may call a gallery function in the process of operating the terminal 100. Then the terminal 100 may output a screen according to the gallery function on the display unit 140 as shown in screen 1401.

For example, the display unit 140 may display a plurality of photos in the Thumbnail View scheme. Further, the terminal 100 may provide items for performing the gallery-phonebook cooperation function of the present invention.

Now referring to screen 1401 of FIG. 14, the terminal 100 may output a virtual key button 14 for supporting the gallery-phonebook cooperation function at one side of the screen. Further, the terminal 100 may provide a menu for a support of the gallery-phonebook cooperation function through a separate menu window. As such, user may request performance of the gallery-phonebook cooperation function through the menu selection on the standby screen for performance of the gallery-phonebook cooperation function based on the terminal 100.

Further, if an input signal for activation of the gallery-phonebook cooperation function occurs, the terminal 100 may support display of the gallery-phonebook file 157 according to the gallery-phonebook cooperation function as in screen 1403. To this end, the terminal 100 may recognize the face of each photo. Further, the terminal 100 may check whether the phonebook information 155 includes information registered as the same face based on the face-recognized information. For example, the terminal 100 may compare the recognized face with the face registered in the phonebook information 155, and may check whether or not there is the phonebook information 155 having the coincided face photo. Further, if there is the coincided phonebook information 155, the terminal 100 may show that the phonebook information 155 is linked with each photo as in screen 1403.

For example, photo 1410 shows a case where two faces are recognized, and the recognized faces are matched with certain face photos included in the phonebook information 155 stored in the storage unit 150. As such, the terminal 100 may control connection of two sets of matched phonebook information to the photo 1410. In this process, as illustrated in the recognized face area, the terminal 100 may inform the user that the face recognition has been succeeded and there is the phonebook information on the recognized face by displaying a dotted line box. Further, the terminal 100 may indicate the fact that there is phonebook information corresponding to the recognized face by displaying "F1", "F2", etc. on a separate area, that is, the bottom area of photo 1410. Here, "F1" and "F2" may be user's name, nickname, phone number, etc. included in the phonebook information.

In the same manner, the terminal 100 may recognize a face and check phonebook information matched with the recognized face in photo 1402. Further, if there is matched phonebook information, the terminal 100 may draw display/output/identify via a mark or other visual indication that there is matched phonebook information. More particularly, the terminal 100 may display the dotted line border corresponding to the face in an area around the face area, and may display at least part of the phonebook information matched with the recognized face. For example, the terminal 100 may support the output "F3" corresponding to name information among information sets included in the phonebook information matched with the recognized face in a certain space within photo 1420. Then user may activate a certain user function based on the matched phonebook information by selecting the dotted line border or "F3". Photo 1430 displays a state where only phonebook information matched with the recognized face is displayed in a certain area of the photo.

As shown in photo 1440, after recognizing the face, the terminal 100 tries to match the recognized face with the face photos of the phonebook information. As a result, there is no matched result, the terminal 100 may support to output certain designated text information or display a dotted line box differently from other boxes.

For example, the terminal 100 may indicate that there is no matched phonebook information by outputting selectable text information, which is "Who?", for a face without matched phonebook information, at one side of photo 1440, or by shadowing the dotted line box.

Here, in case user selects a face without matched information in the phonebook information, the terminal 100 may output a screen for inputting new data in phonebook information as in screen 1405. At this time, the terminal 100 may capture a face photo recognized in the process of identifying the face and may use the captured photo as the new data face photo of the phonebook information, and the name, phone number, e-mail address, etc. may be directly inputted. Further, in case photo 1440 is a photo linked with the phonebook information, the terminal 100 may control automatically extraction of the phonebook information linked with the photo 1440 according to user's new data generation request, and automatically record the name, phone number, e-mail address, etc. in screen 1405. To this end, as described above, the photo 1440 may include a gallery-phonebook file linked with the phonebook information, and such a gallery-phonebook file may be a file provided by another user, or by a certain server by linkage with the phonebook information for each person.

Further, in the case where the user generates an input signal for selecting a certain person in photo 1410, for example, when the user selects an area displayed as "F2" or a dotted line box of a face corresponding to "F2", the terminal may support to perform a calling function based on the phonebook information linked with the selected face as in screen 1407. Here, the terminal 100 may automatically try a voice call connection with the terminal of a user corresponding to the face of "F2" or try a video call connection. Further, the terminal 100 may output a pop-up window for selecting one of a voice call and a video call, and try a call connection according to the selected item.

In addition, as shown in photo 1450, as a result of face recognition, if the photo does not include any separate faces, the terminal 100 may not display any information, may output information indicating that there is no recognized face, for example, "None", in an area adjacent to the photo or within the photo.

Further, in the above description, it was illustrated that the gallery-phonebook cooperation function is performed for all photos included in the gallery, and the gallery-phonebook file 157 is displayed accordingly, but the presently claimed invention is not limited thereto. More particularly, in a state where the gallery-phonebook cooperation function is performed, the gallery-phonebook cooperation function is performed for only a certain photo file designated by user or a certain photo file which is set as default, and the gallery-phonebook file 157 corresponding to the photo file may be outputted in the display unit 140.

Further, the gallery-phonebook cooperation function may be performed when user indicates a certain face of a certain photo. Specifically, in the state where the gallery-phonebook cooperation function is activated, the terminal 100 may perform only face recognition to support only the state indicating there is a recognizable face in a certain photo. Further, in case user selects a recognized certain face, the terminal 100 may search for phonebook information having the face photo matched with the designated face, and may link the information with the recognized face. Here, the terminal 100 may generate a gallery-phonebook file by attaching the searched phonebook information in the photo. In case the gallery-phonebook file is generated, the terminal 100 may support linkage of the phonebook information included in the photo with the recognized face without searching for separate phonebook information.

Further, the above description indicated that the entrance into the gallery-phonebook cooperation function is performed in the gallery function, but the presently claimed invention is not limited thereto. The gallery-phonebook cooperation function may be entered in the phonebook function, for example. To this end, the terminal 100 may support to display a virtual key button 14 for entrance into the gallery-phonebook cooperation function on a screen according to phonebook function performance. Further, the terminal 100 may support entrance into the gallery-phonebook cooperation function through a certain hot key input or a certain menu selection in a standby screen state.

Figure 15:
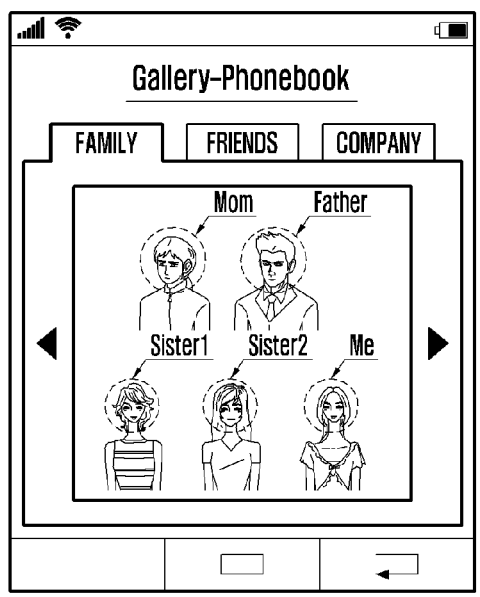
FIG. 15 illustrates a method of displaying a gallery-phonebook file according to a functional cooperation according to an exemplary embodiment of the present invention.
Figure 15:
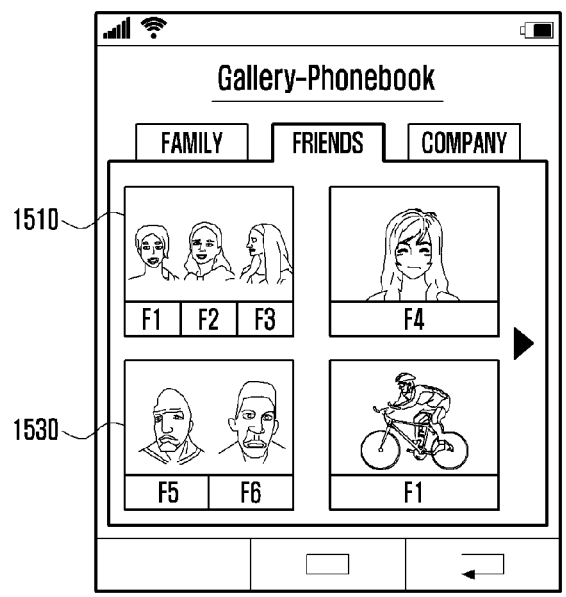
Figure 15:
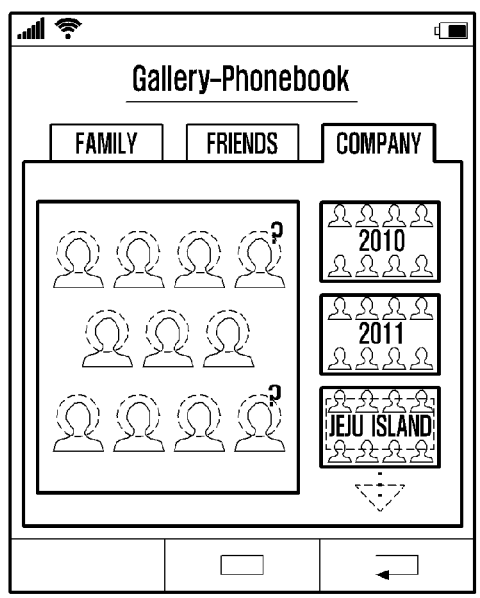

FIG. 15 illustrates an operation of a gallery-phonebook file according to an exemplary embodiment of the present invention.

Referring now to FIG. 15, the terminal 100 may provide a gallery-phonebook file generated by linkage of phonebook information with the photo file. At this time, the terminal 100 may classify the gallery-phonebook files by categories as illustrated. At this time, the classification by categories may be a classification made according to photos stored in the initial gallery. More particularly, the gallery-phonebook files may be automatically generated according to the photo category division of the gallery function provided by the terminal 100. For example, in case photos are classified by categories such as "family", "friends" and "company", etc. as shown in screen 1501, the gallery-phonebook file may inherit and have the same categories. Further, the user may generate categories of gallery-phonebook files and classify newly generated gallery-phonebook files by categories and store the files.

Screen 1501 shows a case where a "family" category has been selected, and a certain photo included in the "family" category may be outputted as default in most of areas of the display unit 140. At this time, the "family" gallery-phonebook file may include text information or dotted line border around the face area indicating that the face included in the photo may be selected. Each recognized face area may indicate the state linked with the phonebook information according to the result face-recognized in advance. As such, a user may select a certain dotted line border area or certain text information, and may use a calling function based on phonebook information linked with the selected area or information. Here, the calling function may automatically perform at least one of a text message service, a voice call service and a video call service, or a screen for a certain service selection may be outputted. Referring to screen 1501, a user may generate a touch event corresponding to a flick operation in a certain direction so as to search for another photo related with the family. Another family-related photo may be a photo including faces of some of the family members, and the faces included in the photo may also be linked with the phonebook information.

Screen 1503 shows a gallery-phonebook file made by linkage of the recognized face in the photo with the phonebook information, and shows a state in which a display method has been applied differently from that of screen 1501. More particularly, the terminal 100 may display a plurality of photos on one screen in a thumbnail view scheme when displaying the gallery-phonebook file. Further, the terminal 100 may display at least part of the phonebook information corresponding to the recognized faces included in each photo, as text information in a certain area of the photo, for example, in the bottom area of the photo. As such, a user may select one of text information sets displayed in the bottom of the photo, and operate the calling function. Here, the terminal 100 may determine the aligned position of the text information corresponding to the phonebook information according to the aligned of each face shown in the photo. For example, in screen 1503, three faces may be aligned, and text information may be divided into, for example, three areas accordingly in photo 1510. A user may operate the calling function based on phonebook information corresponding to the face by selecting text information aligned in parallel with the certain face by respectively checking the aligned position of the face and the aligned position of the text information. In the same manner, photo 1530 shows that two faces are aligned and accordingly text information is also divided into two areas. Further, while the illustrations show that the alignment of the text information is equally distributed in a longitudinal direction, the present claimed invention is not limited thereto. In other words, the terminal may display text information linked with the phonebook information in a position parallel to the longitudinal direction of the aligned position of the face displayed in the photo.

Screen 1505 shows some of photos included in the category as "company" category is selected. Here, screen 1505 shows that a representative photo or a selected photo is enlarged and the other photos are shown in a thumbnail view scheme. At least part of the time information on when the photos have been photographed or at least part of the place information where the photos have been photographed may be displayed on the photos displayed in the thumbnail view scheme. When a certain photo displayed in a thumbnail view scheme is selected, the photo displayed in a photo area of a certain ratio may be changed into the selected photo. Further, in the area where the selected photo is displayed as a certain ratio, the terminal 100 may display a certain mark, for example, a question mark, for a face without phonebook information matched with the recognized face. In case user selects the question mark or a face where the question mark has been displayed, screen 1405 illustrated in FIG. 14 may be outputted.

With regard to the above, states displayed in different display schemes by categories have been described, but the present invention is not limited thereto, and the display scheme of a certain category may be adjusted according to user's selected operation. As such, all categories may be displayed in the same display scheme and may be displayed in different display schemes as described above.

As described above, a terminal for supporting function cooperation and the supporting method according to an exemplary embodiment of the present invention support operation of a call function based on a phonebook based on photos by mutually linking phonebook information included in the phonebook function with photos included in the gallery function. As such, after user recognizes information through images such as a face without recognizing information through text information such as a name and a phone number, the present invention supports a certain function to be used based on the recognized information. Consequently, the present invention supports to clarify situation recognition through an image, and may perform a call connection process in a state where user clearly recognizes what kind of person the other person is. For example, there may be a case where the names registered in the phonebook are the same, but phone numbers are different. In this case, user may check the face displayed in the photo and perform a call connection with the user having the face so as to more accurately performing the user-intended function.

The above described gallery phonebook file may be registered, for example, in a certain server which is set to be accessible by a plurality of users, such as a cloud service, as described above. At this time, the registered gallery-phonebook file may include a photo including a face and phonebook information linked with the face. As such, another user, who checks the file, may acquire phonebook information included in a certain photo more appropriately.

Further, in case the phonebook information receives a gallery-phonebook file linked with the phonebook information from the outside, the terminal 100 may support to update phonebook information based on the phonebook information stored in the photo. Specifically, if the terminal 100 receives a gallery-phonebook file made by the linkage of the phonebook information with the certain face within the photo, the terminal 100 may automatically extract face information and phonebook information recognized by the face recognition in the gallery phonebook file. Further, the terminal 100 may also check whether there is the existing phonebook information matched with the face information. In this process, in case there is matching phonebook information that already existed, the controller of the terminal 100 is configured to check whether the information included in the phonebook information coincides with the phonebook information included in the gallery-phonebook file. Further, in case the information included in the phonebook information does not coincide with the phonebook information included in the gallery-phonebook file, the terminal 100 may control the update of the phonebook information of the storage unit 150 using phonebook information extracted in the gallery phonebook file. At this time, the terminal 100 can check the phonebook information generation date or update date, and the phonebook information recording date of the collected gallery-phonebook file. Further, in case the phonebook information of the gallery-phonebook file is relatively new information, the terminal 100 can control the update of phonebook information of the storage unit 150. Further, in case the phonebook information of the gallery-phonebook file is relatively old information, the terminal 100 may control to update the phonebook information of the gallery-phonebook file based on the phonebook information stored in the storage unit 150. Further, in case there is no phonebook information matched with the face information, the terminal 100 can control automatically generating new phonebook information and record phonebook information extracted from the gallery-phonebook file in the generated phonebook information.

Further, the terminal 100 may further include various additional modules depending on the provided type. More particularly, in the case of a communication terminal, the terminal 100 may include components, which have not been mentioned above, such as a near field communication module, an interface for transmission and reception of data by a wireless communication method or a wireless communication method of the terminal 100, an Internet communication module for performing an Internet function by communicating with an Internet network, and a digital broadcast module for receiving and replaying a digital broadcast. The components may be modified in various manners along with the convergence trend of digital devices, and thus not all such components may be listed here, but the presently claimed invention may include one or a plurality of components of the same level as that of the above mentioned components in the device. Further, some components of the terminal 100 of the presently claimed invention may not be included in the above configuration, or there can be substitution of other components. A person of ordinary skill in the art should understand and appreciate that the claimed invention is not limited to the examples shown and described herein a various substitutions may be made within the spirit of the invention and the scope of the appended claims.

Further, the terminal 100 according an exemplary embodiment of the present invention may include all types of devices for collecting audio signals using a microphone. For example, the terminal 100 may include all types of mobile communication terminals operating according to communication protocols corresponding to various communication systems, and all information communication devices, multimedia devices and other application devices such as a portable multimedia player (PMP), a digital broadcast player, a personal digital assistant (PDA), a music player (e.g., an MP3 player), a portable game console, a smart phone, a notebook computer and a handheld PC, etc.

The above-described methods according to the present invention can be implemented in hardware, firmware or as software or computer code that is stored in a recording medium such as a CD ROM, flash, EPROM, EEPROM, RAM, a floppy disk, thumbnail drive, a hard disk, or a magneto-optical disk or computer code downloaded over a network originally stored on a remote recording medium and then stored on a non-transitory medium and loaded into hardware such as a processor or microprocessor. The machine executable code stored on the non-transitory machine readable medium can be stored on a local recording medium, and loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" or "unit" constitutes hardware in the claimed invention. Finally, the claimed invention can include the use of a location information server comprising more than one server, such as a proxy server. Under the broadest reasonable interpretation, the claimed invention constitutes statutory subject matter in view of 35 U.S.C. §101 and does not constitute software per se.

As described above, the present invention improves a user's information memory and operability, and supports more convenient phonebook information operation by allowing phonebook information operation based on an image.

Further, the present invention supports easy information selection required by a user himself by operating and sharing phonebook information based on an image.

Further, the present invention supports a user's convenient terminal function operation by cooperation based on various elements in operating phonebook information.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of linking a function of a portable terminal, the method comprising:
    recognizing a face included in a currently displayed photo by a controller of the portable terminal;
    determining by the controller whether there is contact information in a phonebook in a storage unit that includes a previously-identified photo of a face that matches with the recognized face being output by a display;
    generating a gallery-phonebook file for a gallery-phonebook of a gallery-phonebook cooperating system having at least photogallery class operations and phonebook and photo-gallery (P &P) synchronization class operations and a Social Network System (SNS) interface controlled by the controller, and in which the gallery-phonebook is provided in addition to the phonebook by linking the contact information in the phonebook from the storage unit that matches with the recognized face of the photo and limit linking of the contact information depending on sharing status of the photo when the currently displayed photo is shared via the SNS interface, and
    displaying at least one gallery-phonebook file, when a gallery-phonebook is executed, the at least one gallery-phonebook file comprising at least one information related to a person with the recognized face.

2. The method of claim 1, further comprising:
    displaying an indication that the contact information has been linked, in the photo.

3. The method of claim 2, wherein the displaying of the information on the display comprises at least one of:
    displaying a selectable geometric shape containing the recognized face therein;
    displaying a selectable geometrically-shaped border around a perimeter of the recognized face;
    displaying text information in a position adjacent to the currently displayed photo optionally in parallel with the recognized face; and
    displaying text information around the recognized face.

4. The method of claim 3, wherein the geometric shape containing the recognized face therein or geometrically-shaped border around a perimeter of the recognized face is at least partially constructed of dotted lines.

5. The method of claim 1, further comprising:
    displaying by the display a plurality of photos in a thumbnail scheme, wherein the generating of the gallery-phonebook file by the controller comprises one of:
    recognizing one or more faces by the controller included in each thumbnail photo of the plurality of photos displayed in the thumbnail scheme, and linking each recognized face displayed in the thumbnail scheme with the contact information so as to generate the gallery-phonebook file;
    recognizing by the controller all faces included in a thumbnail photo indicated by an input signal among photos displayed in the thumbnail scheme, and linking each recognized face with the contact information to generate the gallery-phonebook file; and recognizing by the controller a particular face of a photo indicated by an input signal from among photos displayed in the thumbnail scheme, and linking the recognized face with the contact information to generate the gallery-phonebook file.

6. The method of claim 1, further comprising:

displaying an indication in an area of the display around a face area of the currently displayed photo or in an area adjacent to the currently displayed photo that there is no contact information to be linked when the controller has determined there is no matched contact information.

7. The method of claim 6, further comprising at least one of:

receiving a selection of a face shown on the display without the contact information to be linked and generating new contact information by the controller including the selected face; and uploading the gallery-phonebook file to an external server.

8. The method of claim 1, further comprising:

receiving the gallery-phonebook file by the portable terminal; and updating by the controller of the portable terminal the contact information of the phonebook file with the at least one of information comprised in the received gallery-phonebook file.

9. The method of claim 8, further comprising:

updating by the controller the contact information of the phonebook file with the at least one of information comprised in the received gallery phonebook file when a recording date of the received gallery-phonebook file is more recent than a generation date of the phonebook file stored in the storage unit.

10. The method of claim 8, further comprising:

updating by the controller the at least one of information comprised in the received gallery-phonebook file with the contact information of the phonebook file when a recording date of the received gallery-phonebook file is older than a generation date of the phonebook file stored in the storage unit.

11. A portable terminal for supporting a function linkage, the terminal comprising:

a display;

a storage unit having at least one photo for supporting a gallery function stored therein and storing at least one set of contact information for supporting a phonebook function of a phonebook; and a controller configured for generating a gallery-phonebook file for a gallery-phonebook having of a gallery phonebook cooperating system at least photogallery class operations and phonebook and photo-gallery (P &P) synchronization class operations and a Social Network System (SNS) interface controlled by the controller, and in which the gallery-phonebook in which the gallery-phonebook is provided in addition to the phonebook subsequent to recognizing a face included in currently displayed photo and determining whether there is contact information having a photo including a face that matches with the recognized face, and for linking the contact information that matches with the recognized face, and for controlling the display to display at least one gallery-phonebook file, when a gallery-phonebook is executed, the at least one gallery-phonebook file comprising at least one information related to a person with the recognized face and limit linking of the contact information depending on sharing status of the photo when the currently displayed photo is shared via the SNS interface.

12. The portable terminal of claim 11, wherein the display configured to display information indicating that the contact information has been linked on the photo.

13. The portable terminal of claim 12, wherein the display outputs a display of at least one of:

a selectable geometric shape containing the recognized face;

a selectable geometric border around a perimeter of the recognized face;

text information displayed in a position adjacent to the photo optionally in parallel with the recognized face; and text information around the perimeter of the recognized face.

14. The portable terminal of claim 11, wherein the display displays a plurality of photos in a thumbnail scheme, and wherein the controller controls performing one or more of operations of:

recognizing faces included in each photo for a plurality of photos displayed in the thumbnail scheme, and linking each recognized face in the thumbnail scheme with the contact information to generate the gallery-phonebook file;

recognizing all faces included in a photo indicated by an input signal among photos displayed in the thumbnail scheme, and linking each recognized face with the contact information to generate the gallery-phonebook file; and recognizing a particular face of a photo indicated by an input signal from among photos displayed in the thumbnail scheme, and linking the recognized face with the contact information to generate the gallery-phonebook file.

15. The portable terminal of claim 11, further comprising:

a display that outputs a visual indication that there is no contact information to be linked, wherein the visual indicated is located in an area around a face area of the photo or in an area adjacent to the photo when there is no matched contact information.

16. The portable terminal of claim 15, wherein the controller controls generation of a new contact information including a selected face when a face without the contact information to be linked is selected.

17. The portable terminal of claim 11, further comprising:

a communication unit for uploading the gallery-phonebook file to a certain external server.

18. The portable terminal of claim 17, wherein the communication unit receives the gallery-phonebook file, and wherein the controller updates the contact information of the phonebook file with the at least one of information comprised in a received gallery-phonebook file.

19. The portable terminal of claim 18, wherein the controller updates the contact information of the phonebook file with the at least one of information comprised in the received gallery-phonebook file when a recording date of the received gallery-phonebook file is more recent than a generation date of the phonebook file stored in the storage unit.

20. The portable terminal of claim 18, wherein the controller updates the at least one of information comprised in the received gallery-phonebook file with the contact information of the phonebook file when a recording date of the received gallery-phonebook file is older than a generation date of the phonebook file stored in the storage unit.

\* \* \* \* \*